April 21, 1964
A. BONNELL, JR., ETAL
3,129,605
ADJUSTABLE CONTROL SYSTEM
Filed Sept. 7, 1961
2 Sheets-Sheet 1
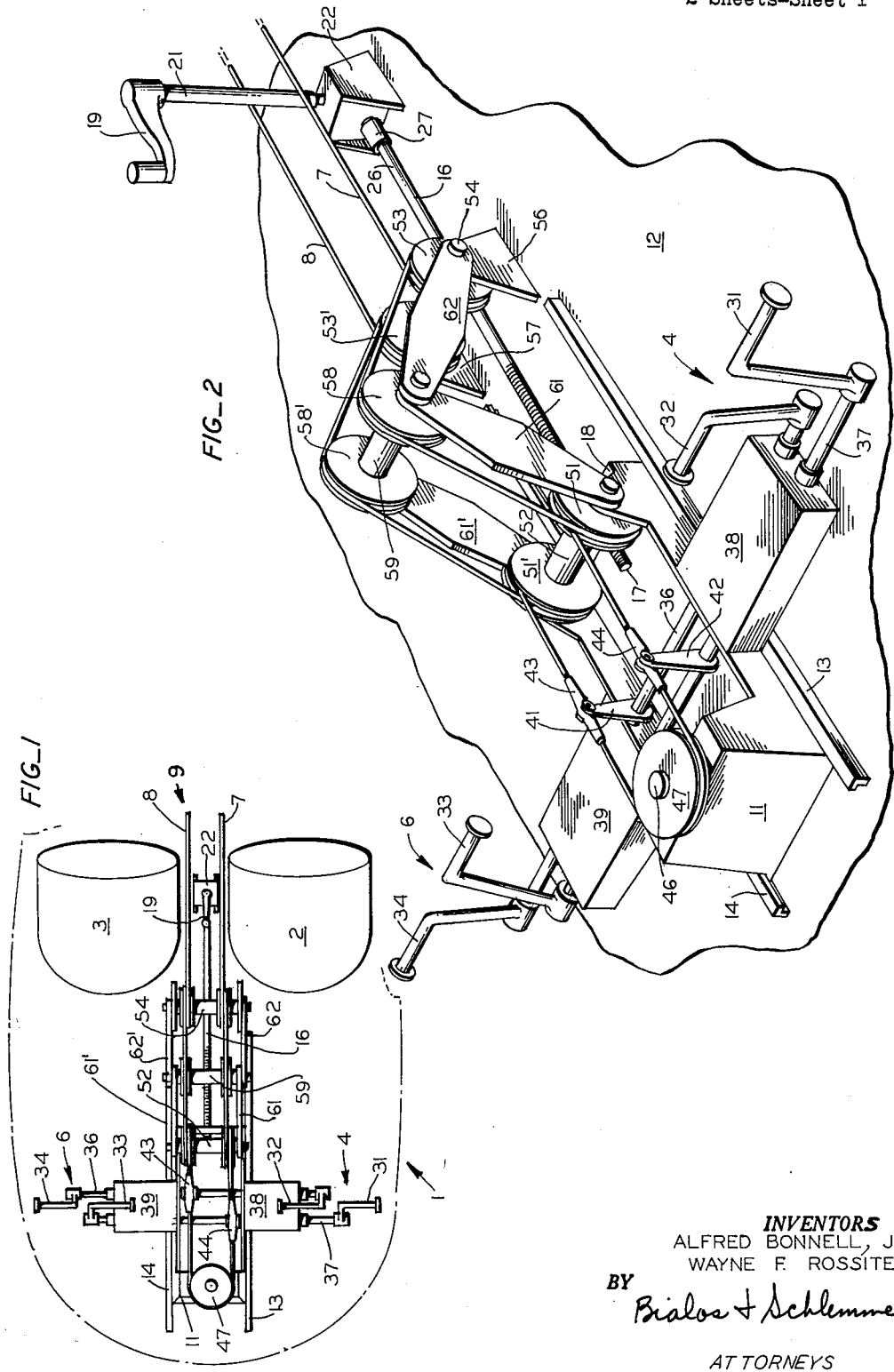
INVENTORS
ALFRED BONNELL, JR.
WAYNE F. ROSSITER
BY Bialos & Schlemmer
ATTORNEYS

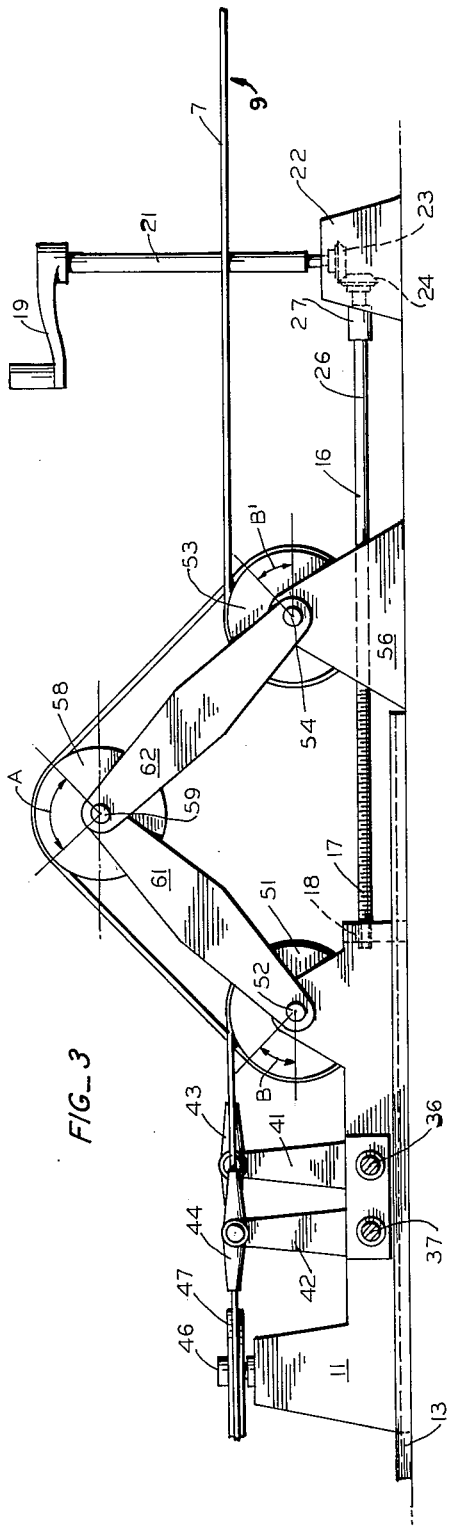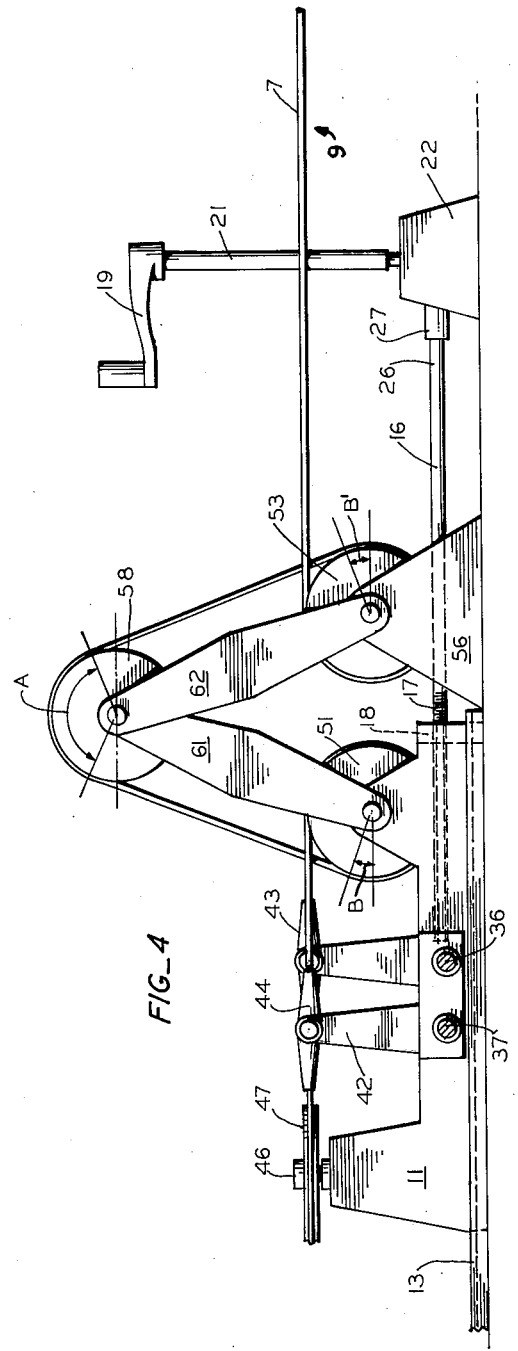
INVENTORS
ALFRED BONNELL, JR.
WAYNE F. ROSSITER
BY Bialos & Schlemmer
ATTORNEYS

United States Patent Office 3,129,605
Patented Apr. 21, 1964

3,129,605
ADJUSTABLE CONTROL SYSTEM
Alfred Bonnell, Jr., Los Altos, and Wayne F. Rossiter, Menlo Park, Calif., assignors, by mesne assignments, to Eltra Corporation, Brooklyn, N.Y., a corporation of New York
Filed Sept. 7, 1961, Ser. No. 136,503
8 Claims. (Cl. 74—501)

This invention relates to a control system and, more particularly, to a control system in which certain operative components of the system are adjustably movable relative to a reference location.

Still more particularly, this invention relates to a control system for a vehicle, such as an aircraft, in which control means, such as pedals, are operatively connected by control cables to a vehicle control structure, such as a rudder or tail rotor. In line with this invention, the control means are adjustably mounted so as to movable relative to a reference location, such as a pilot's station or seat. Additional means is provided in conjunction with the mechanism adjustably mounting the control means for maintaining the predetermined degree of tautness of the control cables of the system substantially unchanged prior to, during and after adjusting movement of the control means to a pre-selected location relative to the reference location.

In a vehicle, such as an aircraft, it is highly desirable that the foot control pedals, such as the pedals which control the rudder in a fixed wing aircraft or the tail rotor in a helicopter, are adjustably mounted relative to a reference location, such as the pilot's seat in an aircraft. Frequently it is not possible for the seat itself to be moved relative to the control pedals due to tight quarters, and other considerations, encountered in an aircraft and other vehicles. However, because of the difference in stature of various individuals, it is necessary for the control pedals to be movable closer to or farther from the pilot's seat, depending upon the stature of the person to be in control of the vehicle.

Hereinafter, reference will be directed to this invention as the same is applied to the control system of an aircraft, but it should be understood that the invention is also adapted for incorporation in the cable control systems of other vehicles as well. The invention should be interpreted accordingly.

In aircraft heretofore, adjustable control pedals have broadly been known. However, prior means for effecting pedal adjustment have proved generally unsatisfactory because such adjustment involved rotating the pedals about their pivot axes either toward or away from the pilot's seat to bring the same either closer to or farther from such seat, depending upon the pilot's stature. It should be understood that during such rotational adjustment, the pedals were lowered relative to the floor boards of the aircraft cockpit or raised relative to such floor boards. That is, the pedal were not moved as a unit longitudinally toward or away from the pilot's seat in prior art constructions. As a result, the pedals could not be maintained at a uniform operative height from the floor boards in all positions of adjustment.

For example, when pedals heretofore were adjusted to bring the same closer to the pilot's seat by rotating the pedals about their pivot axes, the pedals were moved closer to the floor boards. Such a situation, particularly when a pilot of short stature was flying the aircraft, so that appreciable pedal adjustment was required, resulted in the pedals frequently being brought too close to the floor boards to be conveniently manipulated.

Furthermore, with such rotational prior art pedal adjustment means, the pedals were frequently retained in a predetermined operative position by a removable retaining pin engaged in a cooperable quadrant plate. Therefore, it was generally necessary to remove the retaining pin from the quadrant plate to permit rotation of the pedals about their pivotal axes for adjustment. After proper location, the pin then had to be replaced to maintain the pedals in the position of adjustment selected. Frequently such pin and quadrant plate were located in non-accessible positions so that pedal adjustment could not be readily effected. As a result, such pedal adjustment could not normally be effected while the aircraft was in flight.

With the present invention, however, a simple mechanism has been devised for permitting rapid longitudinal pedal adjustment by the pilot from the pilot's station so that the pedals may be adjusted as a unit and positioned in a precise and comfortable location for a given pilot. Furthermore, with the mechanism of this invention, the pedals may be adjusted prior to or during flight. Such adjustment may be made through a full six inches of adjusting movement, or more, as may be required by military specifications.

Also, and importantly, pedal adjustment with this invention does not result in lowering the operative position of the pedals relative to the floor boards of the aircraft cockpit so that, in all positions of adjustment, the pedals are uniformly located relative to the floor boards for ease of manipulation.

Another important feature of this invention resides in the fact that the adjustable control system has incorporated therein means for maintaining substantially unchanged the degree of tautness on the control cables which are operatively connected to the adjustable control pedals. That is, such means makes compensation in the cable control system for movement of the pedals longitudinally toward or away from the pilot's seat to preclude a change in the previously established tautness in the control cables. Such compensation is effected automatically without requiring any action on the part of the pilot other than his selecting the pedal position most convenient for him.

Objects of this invention include the provision of an adjustable control system; the provision of an adjustable control system for a vehicle, such as an aircraft, in which control means, such as foot pedals, may be selectively adjusted prior to or during operation of the vehicle relative to a reference location, such as a pilot's station; the provision in a control system of simple means mounting control pedals for adjustable movement as a unit; the provision in a cable control system of means in conjunction with the cables of the system for automatically maintaining substantially unchanged the predetermined degree of tautness of the cables irrespective of the position of adjustment of the control pedals of the system; and the provision of drive means in such a control system for easily and rapidly effecting adjustment of the control pedals.

These and other objects will become apparent from the following specification, in which reference is directed to the accompanying drawings.

FIG. 1 is a plan view of the cockpit or pilot's station of an aircraft;

FIG. 2 is an isometric view of the adjustable control system of this invention;

FIGS. 3 and 4 are side elevational views of the control system of this invention, showing the same in two stages of control pedal adjustment.

Referring first to FIG. 1, the pilot's station of the aircraft shown generally at 1 includes a pair of side-by-side pilot's seats 2 and 3. Each of the seats has in general alignment therewith control means comprising pairs of control members 4 and 6, respectively. In the embodiment illustrated, the control members comprise foot operated pedals located adjacent the floor boards of the aircraft.

It should be understood that each pair of control pedals is operatively connected with the two parallel reaches 7 and 8 of a control cable 9 which extends rearwardly from the pilot's station and is connected in any well known manner with other control structure of the aircraft. For example, if the aircraft is of a conventional fixed wing type, the control cable 9 would be operatively connected to the tail rudder in the well known manner, while, if the aircraft is of the rotary wing helicopter type, the control cable 9 would be operatively connected to the tail rotor in the well known manner. In this connection, manipulation of either pedal or either pair of control pedals will effect operation of the rudder or tail rotor in the manner well known.

For purposes of clarity, other pilot controls, such as the control stick or wheel, have been omitted from the drawings, in that the same have no bearing on this invention as applied to adjustable control pedals. However, it should be understood that the invention is applicable to other portions of an aircraft cable control system and can be incorporated therein if desired.

Referring now to FIG. 2, the subject control system includes an elongated slide member 11, which is slidably arranged to move over the floor boards 12 of the aircraft cockpit for effecting the longitudinal pedal adjustment mentioned. For this purpose a pair of spaced guide rails 13 and 14 are secured in any suitable manner to the floor boards of the aircraft. Preferably such rails are of angled construction and include an upper lip which overlies a longitudinal flange formed on each side of the slide member 11, as best seen in FIG. 2. Slide 11 is thereby maintained operatively engaged with the floor boards of the aircraft so as to be slidably movable relative thereto.

In the embodiment illustrated, the drive means chosen for moving the slide toward or away from the reference location formed by the pilots' seats comprises an elongated, threaded lead screw 16, the free end 17 of which is threadedly engaged in a threaded bore formed in end plate 18 of the slide member. Upon rotation of screw 16 the slide member will be drawn toward or forced away from the pilots' seats, depending upon the direction of screw rotation. The frictional engagement between the threads of lead screw 16 and the bore in end plate 18 of the slide is sufficient to maintain the slide in a predetermined location of adjustment. However, if desired, disengageable auxiliary means (not shown) could be employed for positively precluding movement of the slide after the same has been located in a predetermined position of adjustment.

For effecting rotation of the lead screw to move the slide longitudinally between the rails, a crank 19 is provided. In the dual control aircraft shown in FIG. 1, the crank preferably is located between the two pilots' seats so as to be accessible by each pilot. However, the crank could be positioned in locations other than that shown so long as the same is conveniently located for ready access by the pilot desiring to adjust the position of the control pedals.

Crank 19 is supported on the end of an upright crank shaft 21, the lower end of which extends into a gear box 22. The gear box 22 may be secured by welding, bolting or other suitable means to the floor or chassis of the aircraft. In such gear box are arranged a pair of interengaged bevel gears 23 and 24 (see FIG. 3). Gear 23 is mounted on the lower end of crank shaft 21 while gear 24 is operatively connected with the end 26 of lead screw 16 opposite its threaded end 17. For the purpose of effecting this connection, a conventional coupling sleeve 27 is provided.

In the embodiment illustrated, upon rotation of the crank 19 in a clockwise direction, as viewed in FIGS. 1 and 2, the lead screw will effect withdrawal of the slide towards the pilots' seats, while rotation of the crank in the counter-clockwise direction will effect movement of the slide away from the pilot's station.

As best seen in FIGS. 1 and 2, each pair of control pedals 4 and 6 comprise left and right foot pedals 31, 32 and 33, 34, respectively. The pedals of each pair are mounted for slidable movement as a unit with the slide member 11 in response to rotation of lead screw 16. In the dual control system shown, the respective right foot pedals 32 and 34 are operatively interconnected by a rotatable pivot shaft 36 on which they are mounted. Similarly, the respective left foot pedals 31 and 33 are interconnected by a rotatable pivot shaft 37 on which they are mounted. The pivot shafts for the respective right and left pedals pass through the slide member 11 and through a pair of bearing blocks 38 and 39 which project from opposite side surfaces of the slide member. The axes of shafts 36 and 37 define the pivot axes of the pedals.

Upright links 41 and 42 are secured to the respective pedal pivot shafts 36 and 37, respectively, and conventional cable connectors 43 and 44 are employed for operatively securing the respective cable reaches 8 and 7 of cable 9 to the respective links in the well known fashion.

Adjacent its forward end, slide member 11 is provided with a short upright pivot shaft 46 which has a cable pulley 47 rotatably mounted thereon. It is about such pulley 47 that the control cable 9 passes so that the two reaches 7 and 8 of the cable are operatively interconnected in well known fashion and parallel relationship. As a result, upon depressing one of the right foot pedals 32 or 34 away from the pilot's seat, link 41 will be rotated counter-clockwise in FIG. 2 to effect rotation of pulley 47 counter-clockwise. This also is accompanied by movement of the control cable. Such cable movement, of course, is also accompanied by and effects rotation of link 42 clockwise, as viewed in FIG. 2, so that the left pedals are rotated towards the pilot's station in response to depressing of the right pedals.

A converse operation obviously is effected upon the left pedals being depressed.

For proper aircraft control it is highly desirable that a substantially constant degree of tautness be maintained on the parallel reaches of the control cable so that uniform response during actuation of the control pedals will be produced irrespective of pedal location. In this regard it is also preferred that the control cable reaches at all times be substantially taut and free of slack or looseness so that "sloppy" response in the control system is obviated.

Longitudinal adjustment of the pedals relative to the pilot's station without compensation being made would result in increasing or decreasing the effective length, and thereby modifying the degree of tautness, of the cable reaches relative to the structure controlled thereby, depending upon the direction of adjusting movement. Accordingly, mechanism and means is provided in this invention for compensating for such adjusting movement by taking up the slack which would be produced when the pedals are moved toward the pilot's seat in the absence of such means and by providing the requisite slack which would be required in the absence of such means when the pedals are moved away from the pilot's seat. That is, such means insures that the degree of tautness on the parallel reaches of the cable is maintained substantially constant and unchanged in all positions of pedal adjustment.

In the embodiment illustrated, such tautness maintaining means includes a series of operatively interconnected pulleys over each of which a cable reach passes. In this connection, three pairs of such pulleys are employed for the intended tautness maintaining function. A first pair of pulleys 51 and 51' are pivotally mounted for rotation on a shaft 52 which extends transversely of the slide member 11. This pair of pulleys comprise part of the slide member, and move directly therewith during pedal adjustment.

A second pair of pulleys 53 and 53' are mounted for pivotal movement about a shaft 54 which extends between a pair of spaced journal brackets 56 and 57 secured to the floor boards of the aircraft in any suitable manner, such as by welding or bolting.

A third intermediate pair of pulleys 58 and 58' are pivotally mounted on a shaft 59 located generally between the firts and second pairs of pulleys and vertically offset therefrom. The third pair of pulleys are movable relative to the lower pairs of pulleys during adjusting movement of the pedals.

Operatively interconnecting the three associated pairs of pulleys are two pairs of link members 61, 62 and 61', 62'.

Three pulleys of the pulley series are all mounted to lie in substantially the same vertical plane and are operatively interconnected by one pair of the two pairs of links. For example, pulleys 51, 58 and 53 all lie in the same plane and are operatively interconnected by links 61 and 62. That is, links 61 and 62 mount upper pulley 58 between the lower pulleys 51 and 53 for vertical movement relative thereto. Similarly, pulleys 51', 53' and 58' lie in another plane which is separate from but parallel to the first mentioned plane. This latter group of pulleys is operatively interconnected by links 61' and 62'.

As seen in FIG. 2, reach 7 of the control cable 9 passes substantially the full distance around each pulley 51 and 53, but merely passes over the upper portion of intermediate pulley 58. Reach 8 of the control cable is similarly engaged with respective pulleys 51', 53' and 58'.

By comparing FIGS. 3 and 4, it should be understood that, upon movement of the slide member and associated control pedals from one position of adjustment to the other, the respective pairs of links 61, 62 and 61', 62' are moved towards or away from each other in generally scissors fashion. That is, for example, when crank 19 is rotated to draw the slide toward the pilot's seat, pulleys 51 and 51' are moved with the slide towards the pair of fixed pulleys 53, 53' operatively secured to the floor boards of the aircraft. Such movement of the slide results in the links being brought towards each other in scissors fashion which results in the upper pair of pulleys 58, 58' being moved vertically by the links and reoriented relative to the lower pulleys. This movement compensates for shortening of the effective length of the control cable reaches due to longitudinal adjusting movement of the pedals. The converse is true when the slide member 11 is moved away from the pilot's seat and the pulleys 58, 58' are moved downwardly by the links.

By comparing FIGS. 3 and 4 of the drawings, it is seen that, when the pedals are located at their farthest location from the pilot's seat, the axis of rotation of the upper pulleys 58 and 58' is spaced a given vertical distance above the axes of rotation of the two pairs of lower pulleys. See FIG. 3. However, as shown in FIG. 4, when the pedals are adjustably drawn towards the pilot's seat, the axis of rotation of the center pulleys 58 and 58' is vertically moved by the links upwardly to lie a greater vertical distance above the axes of rotation of the other pairs of pulleys.

During movement of the slide member in either direction longitudinally relative to the pilot's seat, the cable reaches wrap or unwrap to a greater or lesser degree about the respective pulleys. The varying amount the respective cable reaches wrap around and contact a given pulley in a given position of pedal adjustment is illustrated in the drawings. In this regard, reference is directed to the engagement of pulleys 51, 58 and 53 with cable reach 7, as shown in FIGS. 3 and 4. As noted in such figures, the cable contacts the top portion of intermediate pulley 58 a varying amount, depending upon the position of adjustment of the slide member. That is, the cable is in contact with the intermediate pulley 58 through an angular extent defined by angle A for any given position of adjustment. Angle A is the angular distance between cable tangent points; that is, the angular distance the cable contacts pulley 58 in any given position of adjustment.

Comparing FIGS. 3 and 4, it is seen that angle A increases as the slide is retracted towards the pilot's seat so that the cable contacts more of the pulley circumference. The converse is true as the slide is moved away from the pilot's seat.

The amount that angle A increases or decreases in response to slide movement is exactly equal to the sum of the amounts that angles B and B' of the respective lower pulleys 51 and 53 increase or decrease as the slide moves. Angles B and B' of the lower pulleys are defined by the angular distance between a horizontal plane passing through the axes of rotation of the lower pulleys and the tangent points of those portions of the cable reach which extend between the lower pulleys and the upper intermediate pulley.

By comparing FIGS. 3 and 4, it is seen that as the lower pulleys 51 and 53 are moved toward each other, angles B and B' progressively decrease; that is, the cable is progressively engaged to a lesser extent with the lower pulleys during such movement. The converse is true as the lower pulleys move away from each other. By way of example, if angles B and B' each decrease 15° during retraction of the slide member, angle A will increase 30°, and vice versa.

By way of further example, if all pulleys of each pair are of substantially the same circumference, which is preferred, and if the circumference of each pulley is twelve inches, movement of the slide a distance so that there is an increase in angle A of 30° will result in the cable contacting periphery of upper intermediate pulley 58 one additional inch, while such cable will be in contact with the periphery of each of the lower pulleys 51 and 53 one-half inch less.

If desired, a housing of any suitable type may be positioned over the slide and pulley arrangement shown. However, in the drawings such a housing has been omitted for purposes of clarity.

From the foregoing it has been seen that this invention relates to an adjustable cable control system, preferably for an aircraft, which includes control means, such as control pedals, which are adjustable relative to a reference location. Furthermore, the invention relates to a cable control system in which a substantially constant degree of cable tautness is maintained prior to, during and following positioning of the control pedals in a pre-selected position of adjustment.

While a preferred embodiment of the invention has been shown, it should be understood that modifications thereto which may become obvious to one skilled in the art are contemplated as falling within the scope hereof, and the same should be interpreted in light of the appended claims.

What is claimed is:

1. A control cable system comprising control means, a mounting slide on which said control means is operatively mounted, drive means for selectively advancing or retracting said slide with said control means thereon relative to a reference location, a control cable operatively connected with said control means, and mechanism interposed between said slide and said reference location for maintaining a generally constant degree of tautness on said cable irrespective of the position of adjustment of said slide relative to said reference location; said mechanism comprising a first pulley mounted on said slide, a second pulley mounted independently of said slide, a third pulley interposed generally between said first and second pulleys, and link means movable in scissors fashion operatively interconnecting said three pulleys, said cable passing over each of said three pulleys; movement of said slide toward said reference location resulting in said link means being contracted in scissors fashion, and vice versa, whereby said third pulley is reoriented towards or away from said other two pulleys, depending upon the direction of movement of said slide, to maintain generally unchanged the degree of tautness on said cable during and following such adjusting movement.

2. An aircraft control cable system comprising a pair of control pedals, a mounting slide on which said pedals are operatively mounted, means for selectively advancing or retracting said slide with said pedals thereon relative to a reference location, a control cable operatively connected with said pedals for movement in response to actuation of said pedals, and mechanism interposed between said slide and said reference location for maintaining a generally constant degree of tautness on said cable irrespective of the position of said slide relative to said reference location; said mechanism comprising a first pulley mounted on said slide, a second pulley mounted independently of said slide, a third pulley interposed between said first and second pulleys, and link means movable in scissors fashion operatively interconnecting said three pulleys, said cable passing over each of said three pulleys; movement of said slide toward said reference location resulting in said link means being contracted in scissors fashion, and vice versa, whereby said third pulley is reoriented towards or away from said other two pulleys, depending upon the direction of movement of said slide, to maintain generally unchanged the degree of tautness on said cable during and following such adjusting movement.

3. An aircraft control system comprising a control pedal, a slide adjustably mounting said pedal for movement within predetermined limits toward or away from the pilot's station of said aircraft, means adjacent said pilot's station for selectively effecting positive adjusting movement of said slide and said pedal therewith relative to said station, a control cable operatively connected with said pedal and selectively movable thereby, and mechanism over which said cable passes for maintaining a substantially constant degree of tautness thereon during and following adjustable positioning of said slide and said pedal relative to said pilot's station; said mechanism comprising a series of three spaced pulleys movable relative to each other, said cable passing over each of said pulleys, and a pair of links operatively interconnecting said pulleys, one of said pulleys being mounted on said slide for movement therewith, a second of said pulleys being fixedly mounted in spaced relationship relative to said slide, and the third of said pulleys being supported by said pair of links in generally the same plane as said first two pulleys but in spaced relationship relative thereto; movement of said slide toward said pilot's station effecting drawing said first mentioned two pulleys toward each other and resulting in said pair of links contracting in scissors fashion to move said third pulley and said cable away from said two pulleys, and vice versa, whereby a generally constant degree of tautness may be maintained on said cable during and following adjusting movement of said pedal with said slide.

4. A control system comprising a pair of control pedals, a slide adjustably mounting said pedals for movement within predetermined limits toward or away from a predetermined station, means adjacent said station for selectively effecting positive adjusting movement of said slide and said pedals therewith relative to said station, a continuous control cable having two generally parallel reaches each of which is operatively connected with one of said pedals whereby said cable is selectively movable thereby, and mechanism over which said cable passes for maintaining a substantially constant tension degree of tautness on the two reaches thereof during and following adjustable positioning of said slide and said pedals relative to said station; said mechanism comprising a series of three pairs of pulleys movably mounted relative to each other, each reach of said cable passing over one pulley of each pair of said pulleys, and two pairs of scissors links operatively interconnecting said three pairs of pulleys; one pair of said pulleys being mounted on said slide for movement therewith, a second pair of said pulleys being fixedly mounted in spaced relationship relative to said slide, and the third pair of said pulleys being supported by said two pairs of links generally between and in vertically spaced relationship relative to said first and second pairs of pulleys; movement of said slide toward said station effecting drawing said first mentioned two pairs of pulleys toward each other and resulting in said pairs of links contracting in scissors fashion to move said third pair of pulleys and said two reaches of said cable vertically away from said two pairs of pulleys, and vice versa, whereby a generally constant degree of tautness may be maintained on said cable reaches during and following adjusting movement of said pedals with said slide.

5. A cable control system comprising a control pedal, a slide adjustably mounting said pedal for movement within predetermined limits toward or away from a reference location, a control cable operatively connected with said pedal, and mechanism over which said cable passes for maintaining a substantially constant degree of tautness thereon during and following adjustable positioning of said slide and said pedal relative to said location; said mechanism comprising a series of three spaced pulleys of generally the same size movably mounted relative to each other, said cable passing over each of said pulleys and contacting each such pulley for a predetermined extent of the periphery thereof, and a pair of links operatively interconnecting said pulleys, one of said pulleys being mounted on said slide for movement therewith, a second of said pulleys being fixedly mounted in spaced relationship relative to said slide, and the third of said pulleys being supported by said pair of links in generally the same plane as said first two pulleys but in spaced relationship relative thereto; movement of said slide toward said location effecting drawing of said first mentioned two pulleys toward each other and resulting in said pair of links contracting in scissors fashion to move said third pulley away from such two pulleys, such movement resulting in said cable being increasingly engaged with the periphery of said third pulley and decreasingly engaged with the periphery of each of said first mentioned two pulleys, the amount of increased engagement of said cable with said third pulley periphery being equal to the sum of the decreased amounts of engagement of said cable with the peripheries of said first mentioned two pulleys whereby a generally constant degree of tautness is maintained on said cable during and following adjusting movement of said pedal.

6. An aircraft control system comprising a pair of control pedals, means mounting said pedals for adjustable movement relative to a pilot's station, pilot operable means for selectively advancing or retracting said mounting means and said pedals therewith relative to said station, a control cable operatively connected with said pedals for movement in response to actuation of said pedals for effecting an aircraft control function, and mechanism with which said cable is engaged for maintaining a generally constant predetermined degree of tautness on said cable in all positions of adjustment of said pedals; said mechanism comprising first and second members over which said cable passes and which are movable relative to each other upon adjusting movement of said pedals being effected relative to said station, and means interposed between, operatively connected with, and movable relative to said members for maintaining said predetermined degree of tautness on said cable substantially unchanged in all positions of adjustment of said pedals, said cable being engaged with said last mentioned means whereby compensation for such pedal adjusting movement is made in said cable by said last mentioned means moving relative to said members.

7. An aircraft control system comprising a pair of control pedals, means mounting said pedals for adjustable movement relative to a pilot's station, pilot operable means for selectively advancing or retracting said mounting means and said pedals therewith relative to said station, a control cable operatively connected with said pedals for movement in response to actuation of said pedals for effecting an aircraft control function, and mechanism with which said cable is engaged for maintaining a generally constant predetermined degree of tautness on said cable in all positions of adjustment of said pedals; said mechanism comprising first and second pairs of rotatable pulleys over which said cable passes, said pairs of pulleys being mounted for movement relative to each other upon adjusting movement of said pedals being effected relative to said station, and means interposed between, operatively connected with, and movable relative to said pairs of pulleys for maintaining said predetermined degree of tautness on said cable substantially unchanged in all positions of adjustment of said pedals, said cable being engaged with said last mentioned means whereby compensation for such pedal movement is made in said cable by said last mentioned means moving relative to said members.

8. The aircraft control system of claim 7 in which said pilot operable means comprises a pilot rotatable crank member adjacent said pilot's station, and a lead screw interposed between said crank member and said pedal mounting means for transmitting pedal adjusting motion from said crank to said mounting means.

References Cited in the file of this patent

UNITED STATES PATENTS

| | | |
|---|---|---|
| 391,141 | Golightly et al. | Oct. 16, 1888 |
| 444,006 | Mason | Jan. 6, 1891 |
| 740,127 | Hambray | Sept. 29, 1903 |
| 1,593,478 | Taylor | July 20, 1926 |
| 1,986,035 | Wells | Jan. 1, 1935 |
| 2,212,823 | Bulk | Aug. 27, 1940 |
| 2,478,546 | Pickens et al. | Aug. 9, 1949 |
| 2,610,006 | Boyce | Sept. 9, 1952 |
| 2,873,616 | Schilling | Feb. 17, 1959 |
| 2,908,183 | Di Giovanni | Oct. 13, 1959 |

FOREIGN PATENTS

| | | |
|---|---|---|
| 4,535 of 1876 | Great Britain | Nov. 22, 1876 |